United States Patent [19]
Stahlecker et al.

[11] Patent Number: 6,165,114
[45] Date of Patent: Dec. 26, 2000

[54] ARRANGEMENT FOR MANUFACTURING A CAN

[75] Inventors: Werner Stahlecker, Goeppingen; Berthold Mueller, Suessen, both of Germany

[73] Assignee: Michael Hoerauf Maschinenfabrik GmbH & Co. KG, Donzdorf, Germany

[21] Appl. No.: 09/139,274

[22] Filed: Aug. 25, 1998

[30] Foreign Application Priority Data

Sep. 23, 1997 [DE] Germany ............................ 197 41 859

[51] Int. Cl.⁷ ....................................................... B31B 1/90
[52] U.S. Cl. ........................................... 493/109; 493/134
[58] Field of Search .................................... 493/133, 134, 493/104, 105, 108, 109

[56] References Cited

U.S. PATENT DOCUMENTS 2,200,276  5/1940  Hothersall et al. .
3,364,825  1/1968  Baumgartner ........................... 493/133
4,072,549  2/1978  Amberg et al. ......................... 493/134
4,286,745  9/1981  Fukuoka .
4,295,838  10/1981  Richards et al. ........................ 493/134
5,135,462  8/1992  Stahlecker et al. .

*Primary Examiner*—John Sipos
*Assistant Examiner*—Steven Jensen
*Attorney, Agent, or Firm*—Evenson, McKeown, Edwards & Lenahan, P.L.L.C.

[57] ABSTRACT

A container comprises a sleeve and two end walls. The sleeve is made of a tube having a plurality of paper layers. The end walls are inserted into the sleeve and are bonded in a sealed way thereto. According to the present invention, each of the end walls has a rim which projects outwards, around which rim the tube is bent and bonded by means of heat sealing. A stable, sealed bonding is thus obtained, whereby the application of different materials for the end walls is possible.

7 Claims, 6 Drawing Sheets

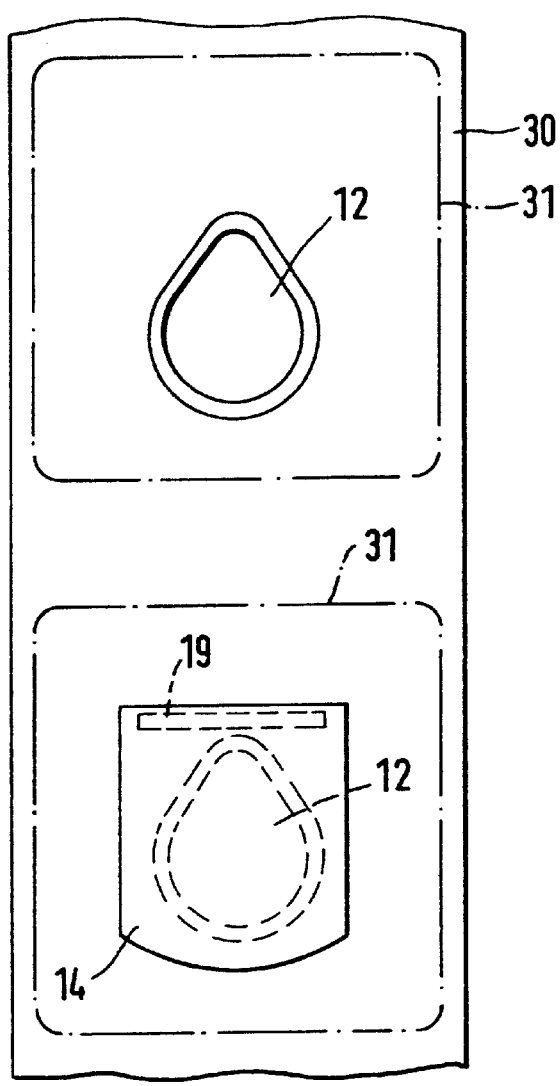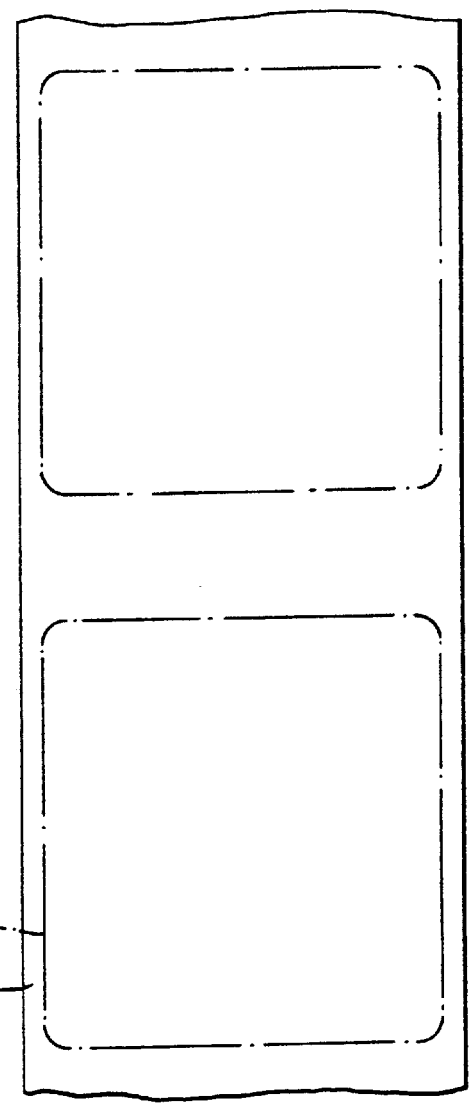

ARRANGEMENT FOR MANUFACTURING A CAN

BACKGROUND AND SUMMARY OF THE INVENTION

This application claims the priority of German patent application 197 41 859.7, filed Sep. 23, 1997, the disclosure of which is expressly incorporated by reference herein.

The present invention relates to a can comprising a sleeve in the form of a tube made of a plurality of paper layers and two end walls which are inserted into the sleeve and are bonded and sealed thereto. The invention relates furthermore to an arrangement for manufacturing a can of the above mentioned type, comprising a work station for feeding a tube, work stations for inserting at least one end wall in each tube, work stations for bending the tube against the respective inserted end wall and work stations for manufacturing heat seal seams which bond the end wall(s) to the tube.

Cans of this generic type are disclosed in the U.S. Pat. No. 4,286,745. In such cans, the paper layers of the tube forming the sleeve are each bonded by means of an intermediate layer made from a suitable material, such as plastic. The sleeve thus obtains a high stability and flexural strength. Due to the high flexural strength of the can, however, it is difficult to form the tube to establish a bond with the end walls. Therefore, in order to create the bond, the edge areas of the end walls are formed rather than the tube. One the other hand, the material of the end walls should not be too thin, as this unacceptably diminishes the clamping effect of the end walls on the bonding point.

In order to produce this type of can, a tube comprising a plurality of paper layers is rolled at a first arrangement, which tube later forms the sleeve of the can. This tube can be produced by means of winding sheets of paper parallel or helically. The finished tube is fed to another arrangement, where the can is completed of inserting the end walls.

An arrangement of the latter type, on which the present invention is based, is disclosed in U.S. Pat. No. 2,200,276. The arrangement comprises a plurality of sequential work stations, to each of which the paper tube is fed in succession. At the work stations, the end walls are gradually inserted into the tube, which is bent around the end walls and bonded therewith by heat sealing. A work station for heating up the tube is arranged directly upstream of the work station which bonds the compoments. In the work station which heats, hot air is suppled to the end areas of the tube, in which the end walls are already inserted. The hot air streams against the outer side of the tube as well as against its inner side, whereby, due to the already inserted end walls, the hot air reaches only a small way into the inside of the tube. This arrangement takes up much floor space and is very complicated in design.

U.S. Pat. No. 5,135,462 discloses an arrangement for manufacturing a can comprising a paper sleeve and two end walls. A single-layer paper tube is wound from one blank, both end walls are inserted therein and bonded thereto with this arrangement by heat sealing. However, it is not possible to produce a relatively bend-resistant tube, particularly a multi-layered tube made from paper.

It is an object of the present invention to make a can in which the sleeve and the end walls are bonded together in a stable condition. A further object of the invention is to design an arrangement for manufacturing such a can.

This object has been achieved in accordance with the present invention, in which the end walls each comprise a rim projecting outwards, around which rim the tube is bent and bonded by heat sealing. In this manner, it is possible to create a stable and sealed bond between the tube which forms the sleeve and the end walls, without being tied to a certain thickness or rigidity of the material of the end walls.

The rim is already present before the tube is bent around it. Such bending and heat sealing, assure that the end wall is clamped securely and held stable by the relatively thick and bend-resistant tube. The clamping effect is permanently ensured by means of the heat sealing, and the joined point is sealed off additionally.

The end wall has absolutely no supporting function. Material can be used, therefore, which is independent of the supporting function, thus permitting end walls of stronger or weaker rigidity, or greater or less thickness. The material properties of the end walls need only be such that they permit the tube to form a stable and sealed bond.

The relatively thick and bend-resistant material does not prevent the production of a stable and sealed bond. Any problems resulting from the thickness or bend-resistance can be solved by means of a suitable arrangement, further described below.

In an advantageous embodiment of the present invention, the tube forms a heat seal seam on each side of a rim, thus creating a particularly stable and sealed bond between the sleeve and the relevant end wall.

It is also advantageous that the end wall comprises in the area of the rim (on at least one side) a heat sealable plastic layer, thus creating the conditions for a particularly effective stable bond.

In a further advantageous embodiment of the invention, a heat sealable plastic layer is provided on the inside of the tube. A plastic layer of this type can be used for producing the above mentioned heat seal seams as well as for sealing the entire inner surface of the sleeve.

In an advantageous embodiment of the present invention, the end wall consists of paper. This cheap material is very suitable for manufacturing the can of the present invention. As the end wall is supported only by the section of the tube bent around the rim, very little is required of the material of the end wall.

In another advantageous embodiment of the present invention, outside of the area of the rim, the end wall is at least approximately planar.

In still another advantageous embodiment of the present invention, the end wall comprises a filling opening.

The object of the present invention has been achieved in that at least one work station for heating the tube is arranged upstream of the work station for inserting a end wall. Both ends of the paper tube can be heated, so that even the thickest material can be bent and sealed without difficulty. As the heating up takes place before the end walls are inserted, the area of the tube which is covered by the rim of a end wall after it has been inserted can be sufficiently heated. This is vital for forming a sufficiently stable heat seal seam between the rim and the inner side of the tube. In addition, the heat also softens the area of the paper tube to be bent, so that it can bend without difficulty.

In an advantageous embodiment, the working stations for heating the tube are designed so that each inner side of an end area of the tube is heated. In this manner, the plastic layer which is usually applied to the inside of the tube and which plastic layer is used for the heat seal seam, can be directly acted upon.

In a further advantageous embodiment of the present invention the work stations for heating the tube are designed so that the respective outer side of an end area of the tube is heated. Thus the paper layers in particular can be softened for bending.

In yet another advantageous embodiment of the present invention, the work stations for heating the tube include at least one device for feeding hot air to the tube. This permits, by means of simple design, the preparation of the end areas of the tube for bending and sealing.

In still another advantageous embodiment of the present invention, work stations for heating the tube, for inserting a end wall, for bending the tube and for producing a heat seal seam are arranged along the circumference of a first and second star wheels. The star wheels comprise holding devices for a gradually completed can, permitting a simple and compact design of the star wheel.

Advantageously a work station for feeding a tube is arranged the first star wheel.

In another advantageous embodiment of the present invention, the arrangement comprises a work station for affixing a closing element to the filling opening.

According to another advantageous feature of the present invention, a work station is provided for moving aside a closing element from the filling opening. This is particularly practical when the can is filled subsequent to its completion.

BRIEF DESCRIPTION OF THE DRAWINGS

These and further objects, features and advantages of the present invention will become more readily apparent from the following detailed description thereof when taken in conjunction with the accompanying drawings wherein:

FIG. 5 is a tape of packing material for the lid of the can of FIG. 1;

FIG. 6 is a tape of packing material for the bottom of the can of FIG. 1;

DETAILED DESCRIPTION OF THE DRAWINGS

Figure 1:
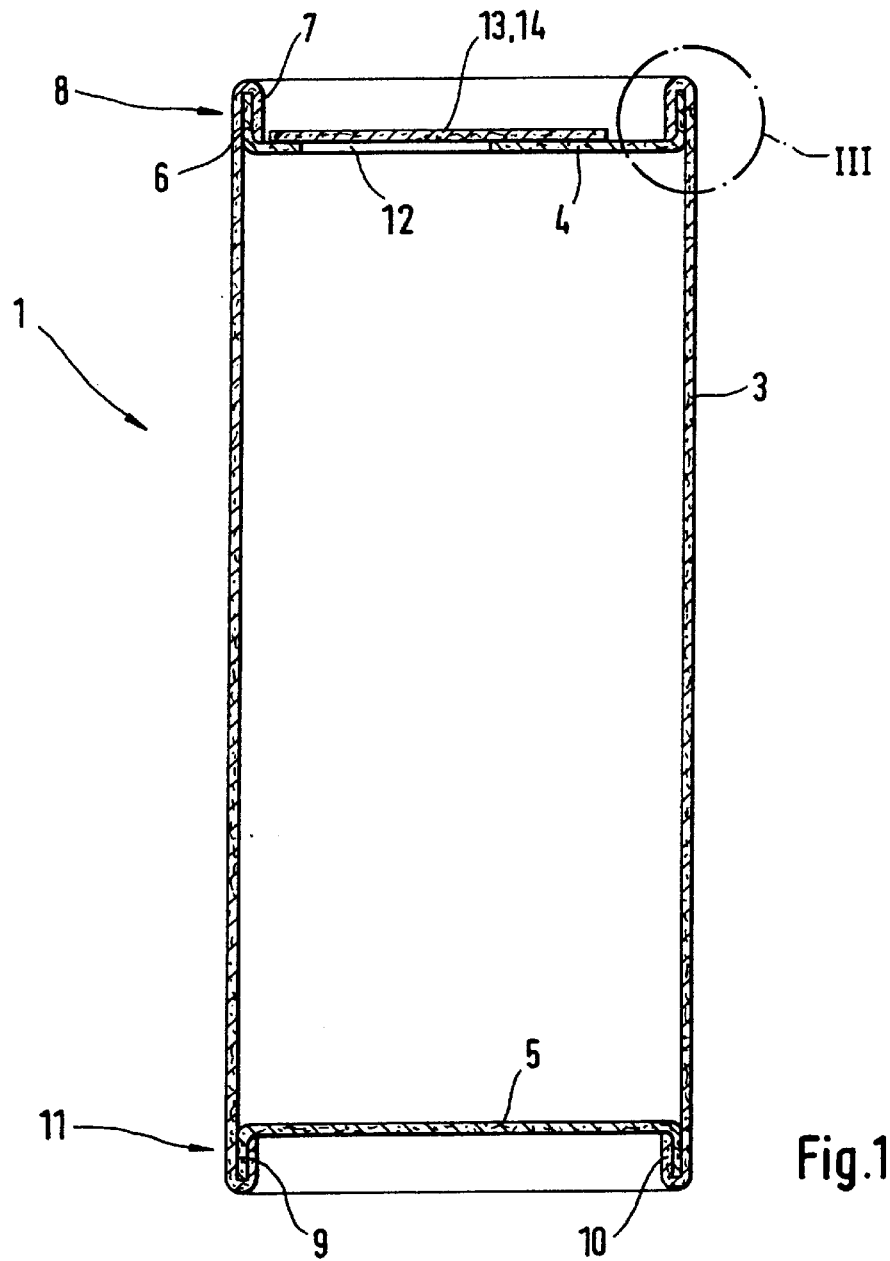
FIG. 1 is a longitudinal section through a can manufactured by means of an arrangement according to the present invention, in a closed state.

FIG. 1 shows an embodiment of a can 1, which has in cross section the form of a rectangle, with round corners. Other cross section forms, such as circular, oval or polygonal forms are, of course, possible.

The can 1 comprises a sleeve 3 and two end walls 4,5 which are inserted into the sleeve 3 and adhered thereto in a leakproof and sterile bond by means of heat sealing. The end wall 4 forms the lid and the end wall 5 forms the bottom of the can 1. The circumferential contour of the end walls 4 and 5 corresponds to the cross section of the can 1.

The end wall 4 comprises a rim 6, around which the sleeve 3 is rolled and which forms a flange 7. A seam area 8 is formed by means of heat sealing.

In a corresponding way the end wall 5 comprises a rim 9, around which the sleeve 3 is rolled and which forms a flange 10. Here also a seam area 11 is formed by means of heat sealing. Outside of the areas of the rims 6 and 9, and therefore over the entire cross section of both front openings of the sleeve 3, the end walls 4 and 5 are planar.

The end wall 4 has a filling opening 12, which can be closed by means of a closing element 13 in the form of a pull tab 14. In the position shown in FIG. 1, the pull tab 14 is sealed over the filling opening 12, so that the can 1 is closed. By tearing off the pull tab 14, the filling opening 12 is uncovered, thus serving as an emptying opening.

Paper or cardboard is used as packing material for the end walls 4 and 5, the packing material having at least one layer made of paper or cardboard. Further layers, for example one or more plastic layers, or a metal foil, may be present in the packing material.

Figure 2:
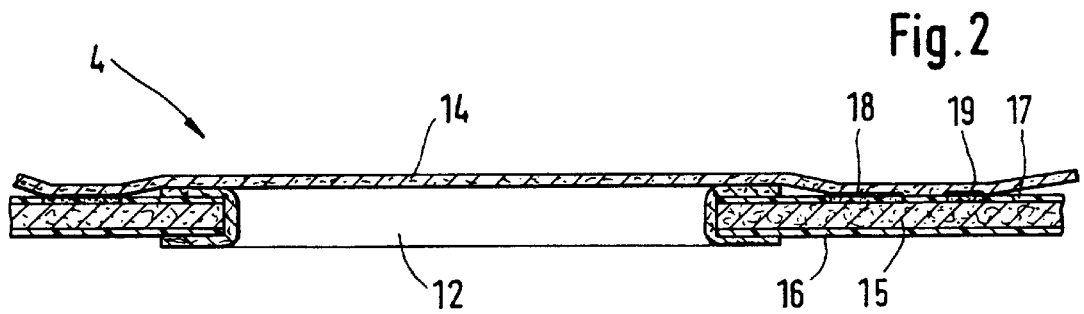
FIG. 2 is an enlarged partial view of the lid of the can of FIG. 1.

As can be seen from FIG. 2, the end wall 4 comprises a middle paper layer 15; on its inner side there is an inner plastic layer 16, and on its outer side an outer plastic layer 17. Both plastic layers 16 and 17 are heat sealable.

The paper layer 15 and the plastic layers 16 and 17 are relatively thin. As can be seen from FIG. 3, the end wall 4 is significantly thinner compared to the sleeve 3 where it is rolled around in the seam area 8, and is also less rigid. But despite these factors, the end walls are sufficient for a leakproof and sterile bond with the sleeve 3.

Figure 3:
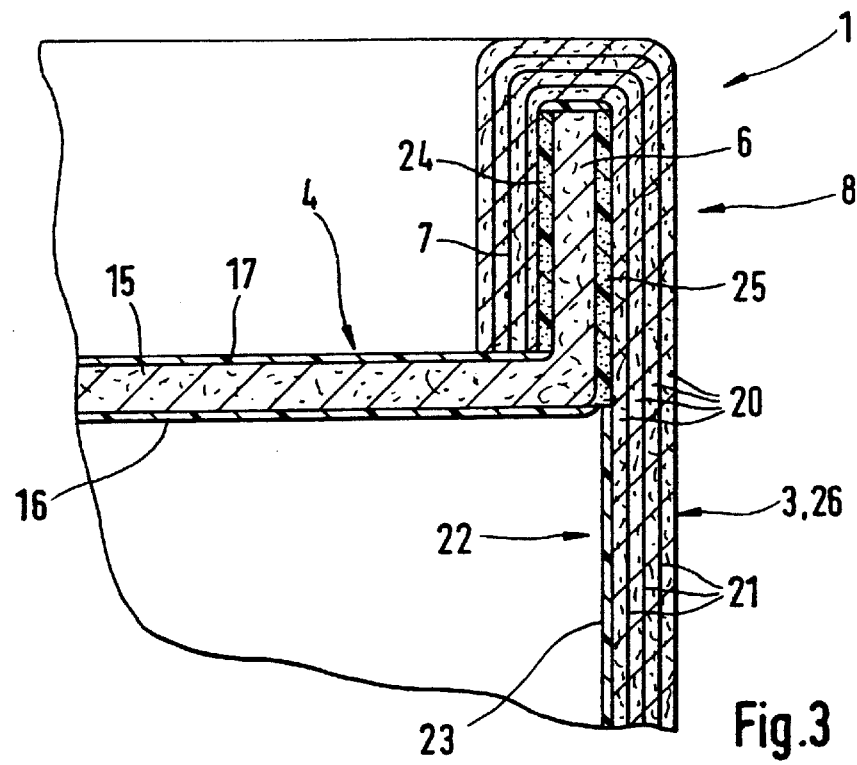
FIG. 3 is an enlarged representation of the area III of FIG. 1.

As can be seen from FIG. 3, both the plastic layers 16 and 17 extend to the area of the rim 6 of the end wall 4. The rim 6 thus comprises on each side a heat sealable plastic layer 16 or 17.

On its side facing the filling opening 12, the pull tab 14 present on the end wall 4 (see FIG. 2) comprises a layer of heat sealable plastic (not shown). This plastic layer is bonded in a sealed way with the outer plastic layer 17 of the end wall 4 along a heat seal seam 18. In addition, the pull tab 14 is affixed to the end wall 4 at an adherence point 19, which is described below.

As can be seen from FIG. 3, the sleeve 3 comprises a plurality of paper layers 20. Various paper or cardboard materials can be used for the paper layers 20, so that they can be thicker or thinner. Between two adjacent paper layers 20, a layer 21 is disposed, which bonds the two paper layers 20 together. Thus a very high degree of bend resistance and stability of the sleeve 3 are obtained. A suitable material for adhering (for example, glue) is used for the layer 21 to bond it to the two layers 20. According to the desired degree of rigidity, the sleeve 3 can be of various widths, for example, one millimeter. The sleeve 3 is provided on its interior 22 with a heat sealable plastic layer 23.

The bent flange 7 of the sleeve 3 is pressed against the rim 6, so that said rim 6 is clamped in and held permanently by means of the above mentioned heat seal bond. The end wall 4 is thus supported by the sleeve 3, and not the other way around. In the seam area 8 two heat seal seams 24, 25 are formed, which generate a sealed bond between the end wall 4 and the sleeve 3. The heat seal seam 24 bonds the plastic layer 23 of the sleeve 3 with the outer plastic layer 17. The heat seal seam 25 bonds the plastic layer 2 3 with the inner plastic layer 16 of the end wall 4. Thus a heat seal seam 24, 25 is formed on both sides of the rim 6 with the sleeve 3. The bond is thus particularly stable and leakproof.

Similar to the end wall 4, the end wall 5 packing material consists of a paper layer, an inner plastic layer and an outer plastic layer. Both plastic layers are heat sealable. The outer plastic layer may be omitted if required. The end wall 5 is bonded to the sleeve 3 in the same way as the end wall 4.

For the manufacture of the can 1, packing material is used which is fed in various forms and thereafter processed. This process is described below.

Figure 4:
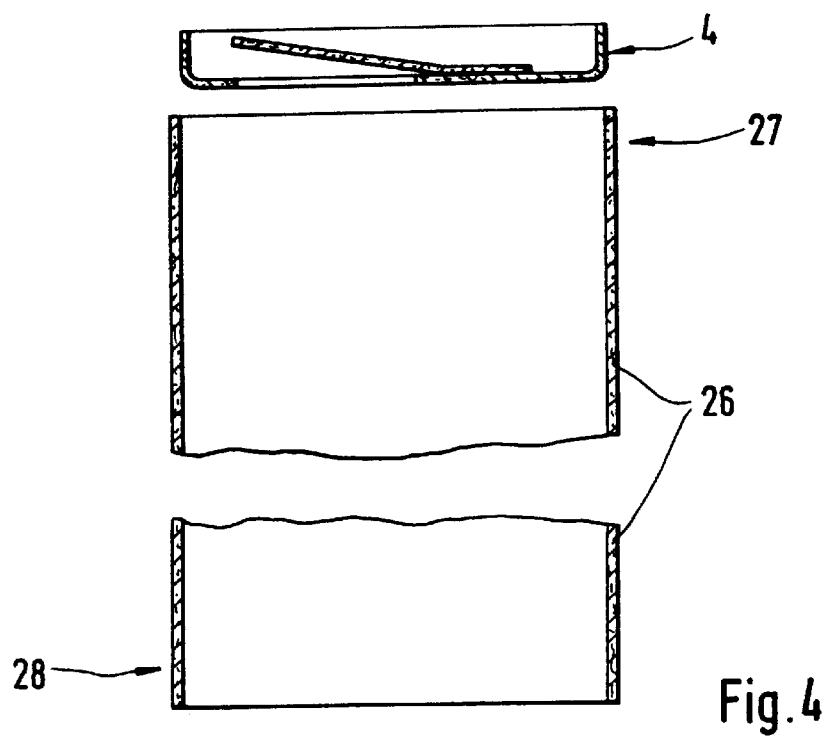
FIG. 4 is a tube for the sleeve of the can of FIG. 1.

Before the can 1 is assembled, the sleeve 3 has the form of a tube 26 as shown in FIG. 4. The composition of the material of the sleeve 3 and the tube 26 are identical. The assembly of the can 1 involves inserting the end wall 4 into the end area 27 of the tube 26, and inserting the end wall 5 into the end area 28 (not shown in FIG. 4). This is described in further detail below.

The packing material for the end wall 4 is fed in the form of a tape 30 (see also FIG. 5). A blank 31, shown by dot-dash lines, is punched out of the tape 30, which blank 31 is formed into the end wall 4.

The tape 30 is already provided with the filling opening 12 for the end wall 4, which is punched out in the area of the relevant blank 31. Before the blank 31 is punched out, the pull tab 14 is affixed on the tape 30 adjacent to the filling opening 12 (lower drawing section of FIG. 5), preferably by heat sealing, only in the area of the adherence point 19. Affixing is thus localized, and permits the pull tab 14 to be moved away from the filling opening 12, which is then uncovered for the purposes of filling.

Figure 7:
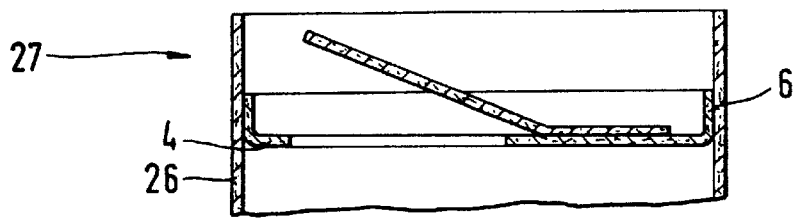
FIG. 7 is a partial view of the tube of FIG. 4 having an inserted lid.

The blank 31 is formed after it has been punched out, so that the projecting rim 6 is formed and the end wall 4 obtains its final form (see also FIG. 7).

The packing material for the end wall 5 is fed in the form of a tape 32, as shown in FIG. 6. A blank 33, denoted by a dot-dash line, is punched out of the tape 32, after which it is formed so that the projecting rim 9 is formed and the final form of the end wall 5 is obtained.

Before the end walls 4 and 5 are inserted in the tube 26, the tube end areas 27 and 28 are heated (see also FIG. 4) which process is described below.

Figure 8:
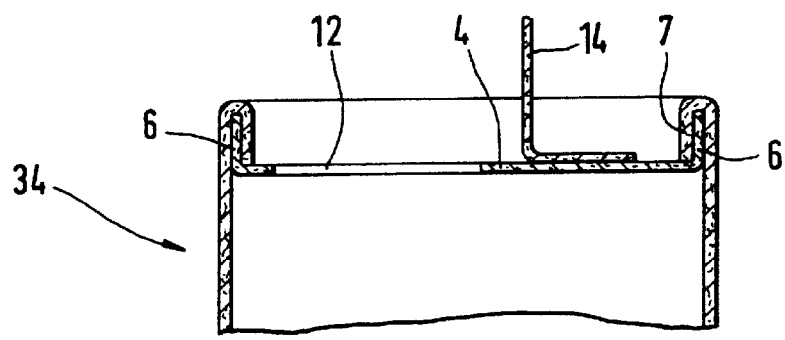
FIG. 8 is the tube of FIG. 7 after it has been bent around the inserted lid.

First the end area 27 is heated, after which the formed end wall 4 is inserted into the open front end of the tube 26 (also FIGS. 4 and 7), so that the rim 6 projects outwards. The section of the tube 26 projecting over the rim 6 is subsequently bent around it. Then a bond is created between the tube 26 and the end wall 4 by heat sealing, so that the flange 7 is pressed against the rim 6. In this manner, the rim 6 is permanently clamped between the inner disposed flange and the area of the sleeve 3 disposed outwards at the same level. At this point, a partly completed paper can 34 has been produced, as shown in FIG. 8. In the position shown in FIG. 8, the pull tab 14 is pulled away from the end wall 4, so that the filling opening 12 is uncovered.

Figure 9:
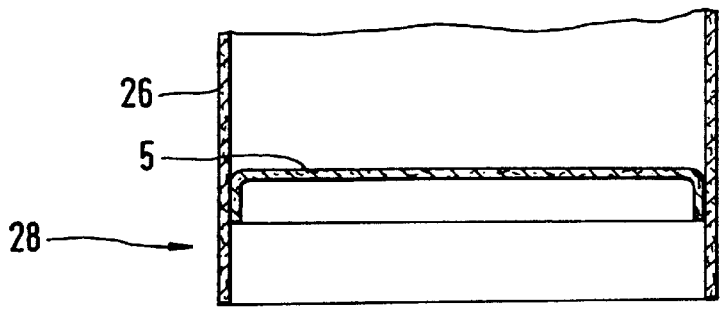
FIG. 9 is a partial view of the tube of FIG. 4 having an inserted bottom.

The end area 28 is then subsequently heated. (See also FIG. 9). Thereafter, the end wall 5 is inserted into the open front end of the tube 26 and bonded in the same way as the end wall 4. (See also FIG. 10). The can 1 is now completed and has obtained the form shown in FIG. 1, whereby the pull tab 14 is not closed.

Figure 11:
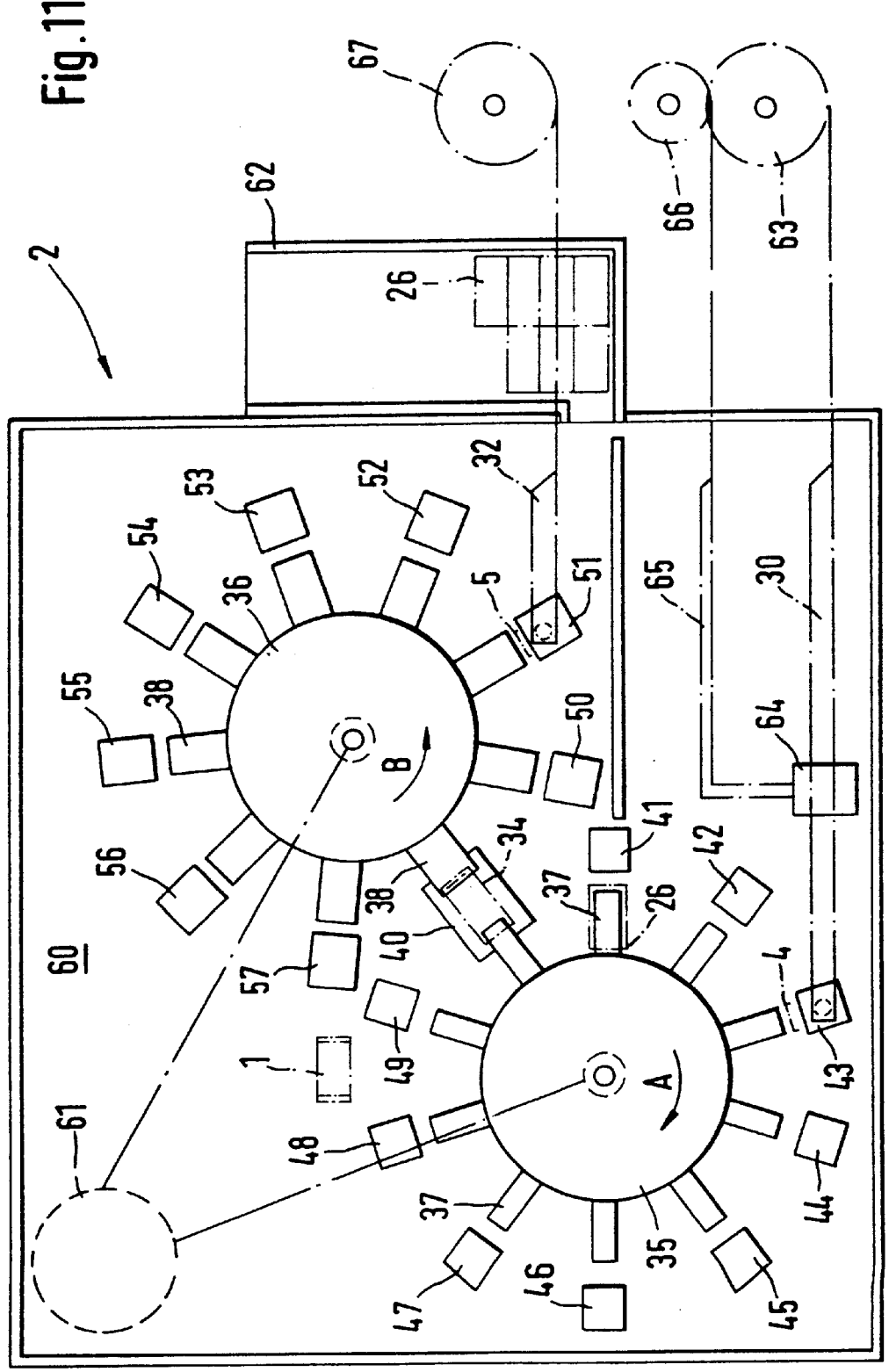
FIG. 11 is an arrangement for producing the can shown in FIG. 1.

The can 1 can be manufactured in the arrangement 2 shown in FIG. 11, which is described below. By means of the arrangement 2, the tubes 26 are joined to the end walls 4 and 5 in stages.

The arrangement 2 comprises a first star wheel 35 and a second star wheel 36, which are each provided with holding devices 37 and 38. Each of the holding devices 37 and 38 takes up a single tube, which is then Processed to a completed can 1 in stages.

Star wheels 35 and 36 are connected with each other by means of a transport device 40. Work stations 41 to 49 are arranged along the periphery of the first star wheel 35, while work stations 50 to 57 are arranged along the periphery of the second star wheel 36. The first star wheel 35 is rotatable in sequence in the direction of the arrow A, while the second star wheel 36 is rotatable in the same sequence, but in the opposite direction (arrow B). The holding devices 37 of the first star wheel 35 and the holding devices 38 of the second star wheel 36 can thus be positioned in sequence at the work stations 41 to 49 and the work stations 50 to 57 respectively. In addition, the holding devices 37 and 38 can be positioned at the transport device 40.

Both star wheels 35 and 36 are arranged on a joint machine frame 60. The front wheels 35 and 36, and at least some of the work stations 41 to 57 are driven by a joint drive 61.

The tubes 26 are fed to the first star wheel 35 via the work station 41. They are removed from a hopper 62 and fed to the work station 41 by means of a suitable transport device. In addition, the tape 30 for the end walls 4 is fed from a reel 63 to the first star wheel 35. On the transport path to the first star wheel 35, the pull tab 14 is attached to the tape at the filling opening 12 (see also FIG. 5) at work station 64. The pull tab 14 is punched out from a tape of material 65, which is fed to the arrangement 2 from a reel 66.

The tape 32 for the end wall 5 is fed from a reel 67 to the second star wheel 36.

For the manufacture of the can 1, a tube 26 taken from the hopper 62 is placed, via the work station 41, upon the mandrel-formed holding device 37 of the first star wheel 35. By means of step-wise rotation of the first star wheel 35 in the direction of the arrow A, the tube 26 reaches the work stations 42 to 49 in succession.

The tube 26 reaches first the work station 42, wherein the end area 27 (in which the end wall 4 is to be inserted) is heated.

Figure 12:
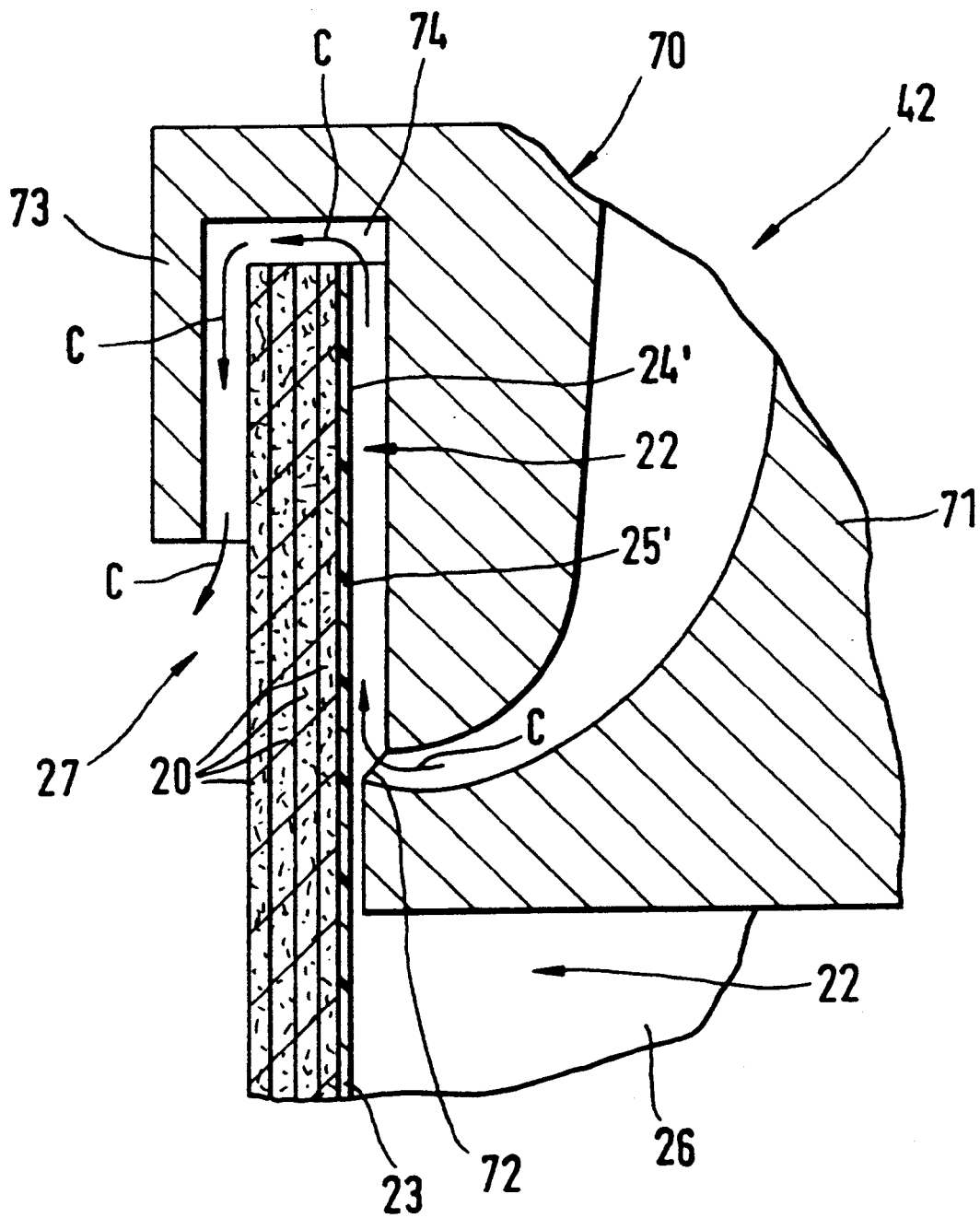
FIG. 12 is a working station for heating an end area of the tube of FIG. 4.

As can be seen from FIG. 12, the work station 42 is provided with a device 70 for supplying hot air. This device 70 comprises a blowing head 71, whose outer contour is adapted to the inner cross section of the tube 26. The blowing head 71 is somewhat smaller than the inner cross section of the tube 26, and is provided with a plurality of air nozzles 72, which are distributed along its periphery.

At a distance from the front end of the blowing head 71, a flange-like edge piece 73 projects from the blowing head 71. The edge piece 73 is designed so that together with the blowing head 71, it forms a channel 74, which extends in circumferential direction and is open at the bottom.

The device 70 can be moved in relation to the tube 26 in such a way that its blowing head 71 is lowered into the inside of the tube 26. The end area 27 of the tube 26 is thus surrounded by the edge piece 73. The air nozzles 72 are essentially directed against the plastic layer 23 of the tube 26. The arrangement and design of the blowing head 71, the air nozzles 72 and the flange-like edge piece 73 is such that the hot air stream coming from the air nozzles 72 cannot penetrate farther into the inside of the tube 26, but rather escapes outwards in the direction of the arrows C over the end wall of the tube 26. The walls of the channel 74 serve in this case as air conducting elements.

As can be seen from FIG. 12, the hot air stream acts on the entire end area 27 of the tube 26. Thus, both the inside area 22 and the outside of the end area of the tube 26 are heated. The hot air stream heats therefore the areas 24' and 25' of the plastic layer 23, in which the heat seal seams 24 and 25 are later formed. It is therefore possible to heat also the area 25', which is covered by the rim 6 after the end wall 4 has been inserted.

The hot air from the air nozzles 72 streams through the inner side 22 as well as the front end and the outer side of the end area 27 of the tube 26. The paper layers 20 in the section of the tube 26 to be subsequently bent are also warmed by means of the heat. The heat is stored in the paper layers 20 for such a length of time that it is at least still partly present during the subsequent heat seal process. It is thus possible, regardless of the thickness of the material of the tube 26, to bend the heated end section of the tube 26 over the rim 6 and to form the heat seal seams 24 and 25.

By further rotation of the first star wheel 35, the tube 26 reaches the work station 43. (See also, FIG. 11). At this working station 43, the following processing stages are carried out: a blank 31 is punched out of the tape 30, the rim 6 is formed by means of the respective formation of the blank 31, and the completed forms of the end wall 4 are inserted into the tube 26, so that the stage of completion as shown in FIG. 7 is obtained.

After the end wall 4 has been inserted, the end area 27 of the tube 26 is heated again. This occurs in the similar work stations 44 and 45. As the end wall 4 is already inserted in the tube 26, the area 25' is covered by the rim 6. A high degree of the heat supplied in the work station 42 is still present in the paper layers 20 and also in the plastic layer 23.

The entire end area 27 of the tube 26 is heated again by means of the work stations 44 and 45, the latter arranged downstream of the work station 44. In this manner, the rim 6 of the inserted end wall 4 is also heated.

The work stations 44 and 45 are designed in a similar way to the work station 42. The heated air fed by means of the work stations 44 and 45 takes a similar course to the heated air in work station 42. The heated air flows firstly in the direction towards the inner side 22 of the tube 26 and acts on the rim 6. The heated air then flows over the area of the plastic layer 23, which adjoins the rim 6 towards the front end, and exits over the end wall out of the tube 26 and flows also along past the outer side of the end area 27 of the tube 26. It can thus be seen that the entire end area 27 of the tube 26 is heated again by means of the work stations 44 and 45.

In the work station 46, the section of the tube 26 projecting over the rim 6 is bent inwards, so that the stage of completion shown in FIG. 8 is obtained. Despite the thickness and inflexibility of the material of the tube 26, this bending is achieved without great difficulty due to the heating of the material.

In the work stations 47 and 48, the section of the tube 26 bent around and surrounding the rim 6, is pressed against it. The unheated plastic layer 16 and the heated plastic layers 17 and 23 form the heat seal seams 24 and 25.

In the work station 49, the pull tab 14 is moved away from the filling opening 12, so that it obtains the position as shown in FIG. 8.

When the first star wheel 35 turns in a further sequence, the holding device 37 containing the partly completed paper can 34 reaches the area of the transport device 40. The partly completed paper can 34 is transported linearly to a holding device 38 in the form of a take-up tube which is disposed opposite. The paper can 34 is seized by the holding device 38 and brought by means of the rotation of the second star wheel 36 to the area of the work station 50. Here the end area 28 of the tube 26 is heated. This takes place in the same way as the heating of the end area 27 in the work station 42.

In the next work station 51 in rotational direction B, the blank 33 is punched out of the tape 32, the rim 9 is formed by means of relevant deformation of the blank 33 and the completed end wall 5 is inserted into the still unsealed front end of the partly completed paper can 34. A machine tool (not shown), inserted through the filling opening 12, serves as a counter holder, which spreads out umbrella-like.

Figure 10:
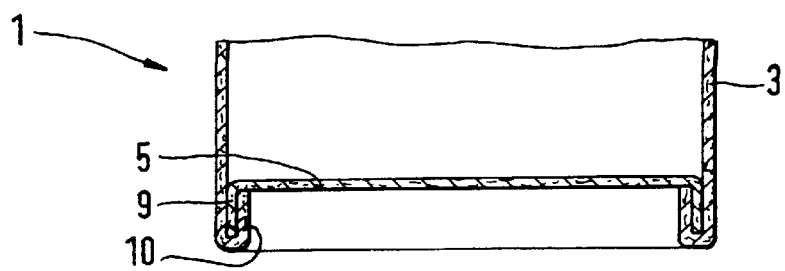
FIG. 10 is the tube of FIG. 9 after it has been bent around the inserted bottom.

At the work stations 52 and 53, the end area 28 and the rim 9 are heated. At the work station 54, the section of the tube 26 projecting over of the rim 9 is bent around the rim 9, so that the stage of completion shown in FIG. 10 is obtained. At the work stations 55 and 56, the section of the tube 26 which is bent around the rim 9, is now pressed against same. Thus the relevant heat seal seams are formed. At the work station 57, the completed can 1 is pushed away from the holding device 38, and reaches a collecting container by means of a chute.

The work stations 50 to 56 of the second star wheel 36 are designed in the same way as the corresponding work stations 42 to 48 of the first star wheel 35. They are therefore not described in any further detail here.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for manufacturing a container comprising:
   a work station for feeding a tube;
   work stations for inserting at least one end wall in each tube;
   work stations for bending the tube against a peripheral flange of a relevant inserted end wall;
   work stations for manufacturing heat seal seams binding the end wall to the tube; and
   a conveyor device for transporting a tube consecutively between said work stations; wherein
   at least one work station having a heating unit for heating the tube is provided upstream of the work stations for inserting said end wall;
   the heating unit for heating the tube heats a radially inner surface of an end area of the tube, including a radially inner surface portion of said end area to be covered by said flange of an end wall after said insertion of said end wall into the tube; and
   at least one work station for heating said end area of said tube is provided downstream of the work stations for inserting said wall.

2. The apparatus according to claim 1, wherein the work stations for heating the tube are designed so that a radially outer surface of an end area of the tube is heated.

3. The apparatus according to claim 1, wherein the work stations for heating the tube comprise at least one device for supplying hot air to the tube.

4. The apparatus according to claim 1, wherein said conveyor device comprises first and second star wheels, each of which comprises:
   a work station having a heating unit for heating said tube;
   a work station for inserting an end wall;

a work station for bending the tube;

at least one work station for producing at least one heat seal seam; and respective holding devices for partly completed paper cans.

5. The apparatus according to claim 4, wherein the work station for feeding a tube is arranged on the first star wheel.

6. The apparatus according to claim 1, wherein the arrangement comprises a work station for affixing a closing element to a filling opening.

7. The apparatus according to claim 1, wherein the arrangement comprises a work station for moving away a closing element from a filling opening.

* * * * *